United States Patent [19]

Conner

[11] 3,877,722

[45] Apr. 15, 1975

[54] MUD FLAP APPARATUS FOR TRUCKS

[76] Inventor: Harold V. Conner, 9339 E. Bartola Ave., Pico Rivera, Calif. 90660

[22] Filed: May 7, 1973

[21] Appl. No.: 358,140

[52] U.S. Cl............................ 280/154; 280/154.5 R
[51] Int. Cl............................................. B62d 25/16
[58] Field of Search...... 280/154.5 R, 152 R, 152.3, 280/154, 159

[56] References Cited
UNITED STATES PATENTS

| | | | |
|---|---|---|---|
| 1,904,342 | 4/1933 | Zaiger et al.................. | 280/154.5 R |
| 2,935,336 | 5/1960 | Case............................ | 280/154.5 R |
| 3,337,238 | 8/1967 | Weasel, Jr.................... | 280/154.5 R |
| 3,582,109 | 6/1971 | Moore.......................... | 280/154.5 R |

*Primary Examiner*—Allen N. Knowles
*Attorney, Agent, or Firm*—J. Carroll Baisch

[57] ABSTRACT

Mud flaps for trucks and the like having a three-piece transverse supporting member, there being a central member removably attachable to the frame of a truck chassis and outer members removably connected to the central member. Flexible members having their upper ends connected to the respective outer members and a marginal rigid strip of metal or the like at the opposite or lower end. There is a vertical rigid member for each of the flaps, said vertical members being pivotaly attached at their upper ends to the respective outer transverse members and being releasably attached to the respective rigid marginal strips when installed.

The vertical members are adapted to be pivoted into parallel position relative to the respective outer transverse members and the outer transverse members are adapted to be disconnected from the central transverse member and the flaps are adapted to be rolled about the transverse members for carrying purposes.

3 Claims, 5 Drawing Figures

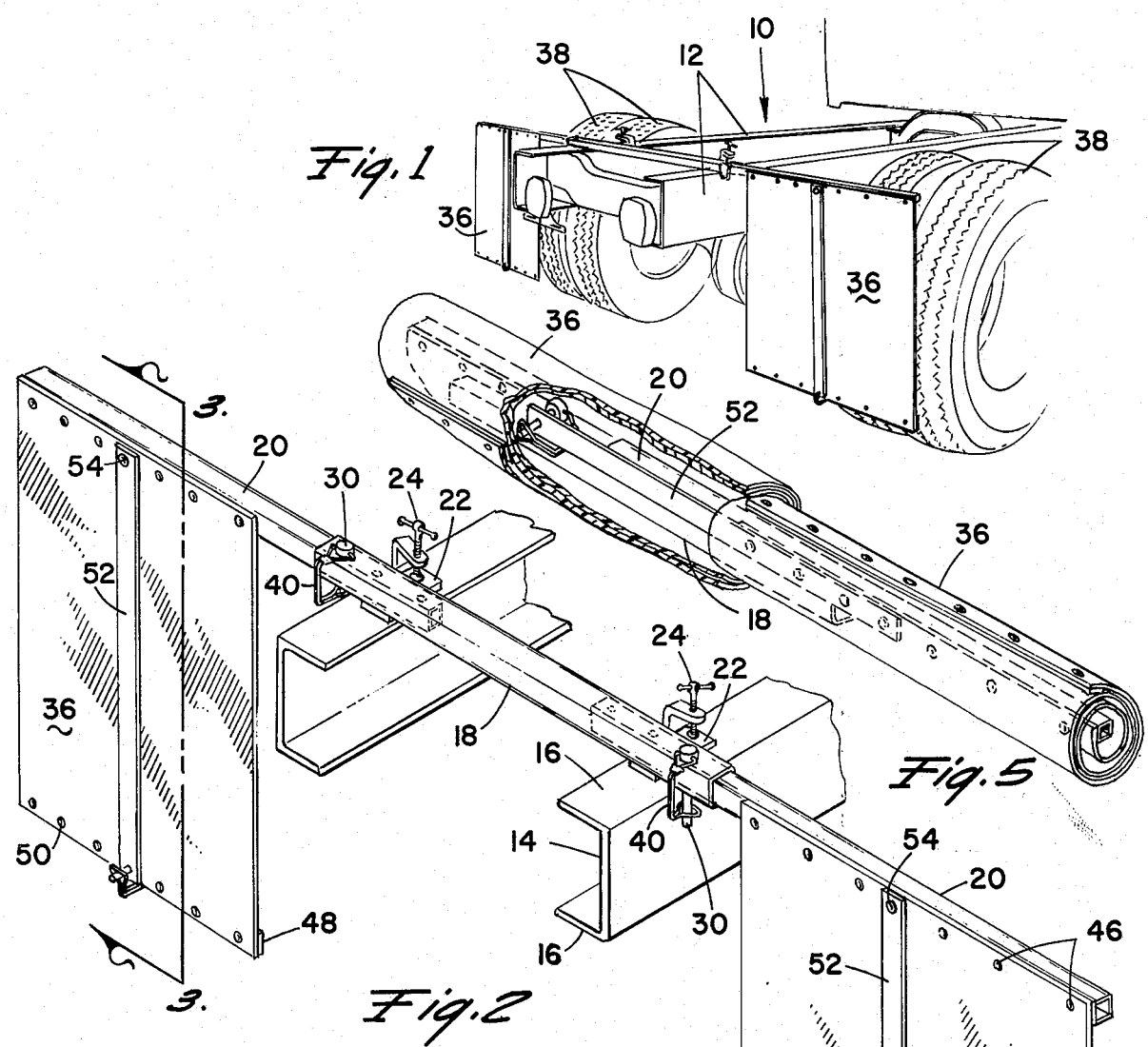
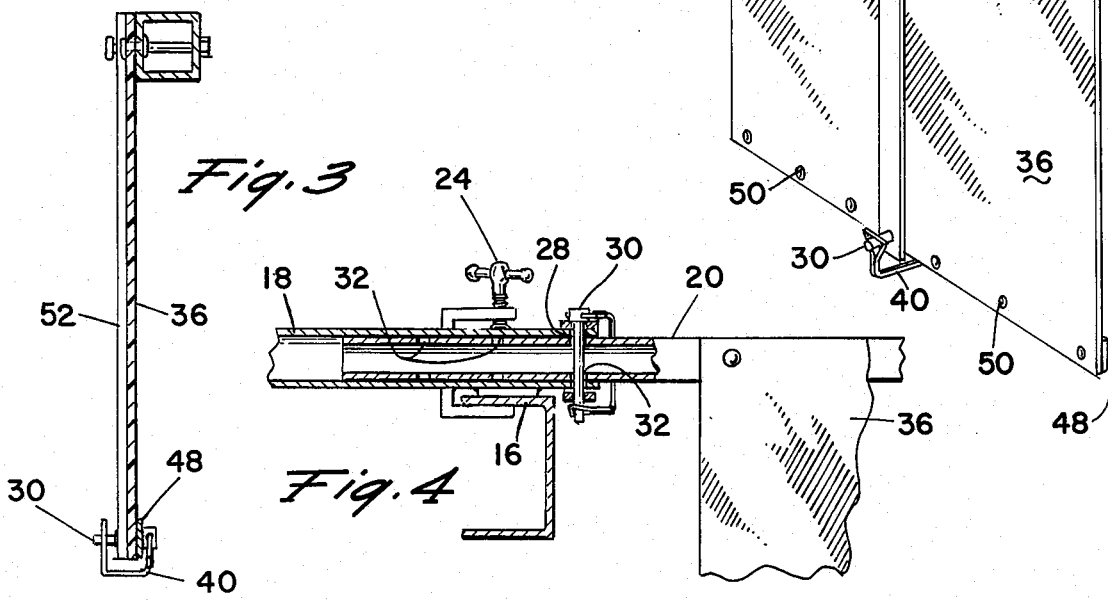

MUD FLAP APPARATUS FOR TRUCKS

BACKGROUND OF THE INVENTION

1. Field of the Invention.

This invention relates generally to mud flaps for trucks and the like and relates more particularly to easily removable flaps.

2. Description of the Prior Art.

When trucks without a body on them are moved, they are required to have mud flaps. Heretofor, it has been common practice to secure a piece of 2 × 2 lumber to the rear end of the chassis frame, the 2 × 2's extending transversely of the chassis. The flaps are of cardboard and very often become detached. This arrangement is very unsatisfactory for wellknown reasons.

SUMMARY OF THE INVENTION

The present invention comprises a threepiece transversely extending support for mud flaps and this support is removably attached to the rear ends of the truck chassis or frame. This transverse support comprises a central member or section and an outer member or section at each end of the central section.

The outer members or sections, are detachably attached to the central section and there is at least one flexible flap for each of the outer sections. These flaps are of a flexible plastic of any well-known type such as polyester or any other suitable plastic material. The upper ends of the flaps are secured to the outer members or sections and the lower ends are provided with horizontal marginal strips of rigid material such as a suitable metal (iron for example). There is a vertical member for each of the flaps, the upper end of said vertical members being pivotly secured to the respective outer sections. These vertical members extend downwardly substantially mid-way between the side edges of the respective flaps and the lower ends of vertical members are releasably secured to the horizontal strips.

When it is desired to carry or transport the above described assembly, the lower ends of the vertical members are disconnected from the horizontal strips and pivoted to a position parallel to the respective outer members or sections. The outer members or sections of the transverse support or supporting means are released from the central section thereof and removed therefrom and the central section is disconnected and removed from the chassis frame. The three members or sections of the support or supporting means are placed together in parallel relationship to each other and the flaps rolled about them. Straps or the like may be used to secure the roll or bundle so that it may be readily carried or otherwise transported.

OBJECTS AND ADVANTAGES OF THE INVENTION

It is an object of the invention to provide easily installed and easily removable mud flaps for trucks, particularly the chassis of trucks before the body has been secured thereon.

It is another object of the invention to provide an arrangement of this character that can be quickly installed and quickly removed.

Still another object of the invention is to provide an arrangement of this character wherein the parts may be packaged into a relatively small bundle for easy carrying or otherwise transporting.

A further object of the invention is to provide an arrangement of this character wherein the supporting means for the flaps are in several sections which are adapted to be rolled in the flaps when the parts are packaged.

A still further object of the invention is to provide means for preventing the flaps from sailing or crawling when installed on a truck.

Another object of the invention is to provide apparatus of this character wherein the flaps are adjustable to any size tire and will fit all size tires, dual or single.

The characteristics and advantages of the invention are further sufficiently referred to in connection with the following detailed description of the accompanying drawings, which represent one embodiment. After considering this example, skilled persons will understand that many variations may be made without departing from the principles disclosed and I contemplate the employment of any structures, arrangements or modes of operation that are properly within the scope of the appended claims.

BRIEF DESCRIPTION OF THE DRAWINGS

Referring to the drawings, which are for illustrative purposes only:

FIG. 1 is a perspective view of the rear portion of a truck chassis with the invention attached thereon in operative position.

FIG. 2 is an enlarged perspective view of the invention attached to the rear portions of the frame members of the truck chassis.

FIG. 3 is a sectional view taken on line 3—3 of FIG. 2.

FIG. 4 is an enlarged fragmentary view partially in section and showing details of the telescoped support members and the clamp securing same to the frame of the truck chassis; and FIG. 5 is a perspective view showing the parts of the invention rolled up in an easily handled package.

DESCRIPTION OF THE PREFERRED EMBODIMENTS

Referring more particularly to the drawings, there is shown the rear portion of a truck chassis indicated generally at 10, said chassis including longitudinally extending laterally spaced frame members 12. These frame members are of the usual character being channel-shaped with the open sides facing each other. More specifically, each frame member has a vertical part 14 and upper and lower horizontal parts 16 along the top and bottom edges of the part 14.

Support means is provided which comprises a tubular central member 18 and oppositely arranged tubular outer members 20 having their inner ends partially telescoped within the central member 18. Adjacent each end of the central member is a flange 22 welded or otherwise suitably secured to the underside of said central members so that said flanges will lie flat on the upper horizontal parts of the frame members of the truck. A C-clamp 24 is provided for securing the flanges 22 to the truck frame members and provide means for releasably securing the apparatus to the truck chassis or the frame members thereof.

Adjacent each end of the central member and spaced outwardly a sufficient distance to be clear of the adjacent truck frame members, there are aligned openings 28 in the horizontal parts of the central member for reception of releasable retaining pins 30 which are adapted to extend through aligned openings 32 of the respective outer members. There are several such aligned openings 32 in each of the outer members so that they may be adjusted longitudinally of the central member to locate the flaps 36 in proper relationship behind the wheels 38 of the truck. It is to be noted that there is a C-shaped spring 40 to retain said pins in holding position.

The flaps 36 have their upper ends secured to the respective outer members 20 of the supporting means by means of rivets 46 or any other suitable means. At the lower end of each flap, there is a reinforcing bar 48 along the lower edge of the respective flaps and said bar is secured to its flap by means of rivets 50 or any other suitable means.

Means for preventing the flaps from sailing or crawling is provided and, as shown, comprises a vertical bar 52 at the rear side of each flap and said bars are pivotly secured to the respective outer members of the supporting means by rivets 54 or any other suitable means. Adjacent its lower end, each bar is provided with an opening which, when the bar is in operative position, is in alignment with openings, not shown, in the flap and strap. There is means for securing the bar to the flap and strap and such means comprises a pin 30 having a C-shaped spring 40. This device is the same as that herein described above in connection with the pin 30 and carrier 40.

The above described apparatus may be easily and quickly put together and attached to the frame members of the truck chassis.

Should it be desired to remove this apparatus, and package it for carrying or storage, the spring 40 is removed from around pin 30 so that the respective pin 30 may be pulled from the central member 18. The bar 52 is then pivoted upwardly to be parallel with its respective outer support member.

C-clamps 24 are also removed and the members 18 and 20 then placed together in parallel relationship. Thereafter, these members are then rolled in the flaps as shown in FIG. 5. The flaps are arranged in the roll so that the outer end of one flap is at the outer end of the members rolled therein while the other flap has its outer end at the opposite outer ends of the encompassed support members. Straps, not shown, may be used to secure the parts in the rolled position although other means may be used for this purpose.

The above objects and advantages are fulfilled by the above described apparatus. The apparatus may be easily and quickly attached to the truck chassis and may be as easily and quickly removed.

The flaps may be adjusted for all sizes of tires and may be positioned to fit dual or single tires. When the apparatus is installed, the flaps are held in proper position and cannot sail or crawl. Further, the entire apparatus may be packaged for easy handling, carrying or storage.

The invention and its attendant advantages will be understood from the foregoing description and it will be apparent that various changes may be made in the form, construction and arrangement of the parts without departing from the spirit or scope thereof or sacrificing its material advantages, the arrangement hereinbefore described being merely by way of example and I do not wish to be restricted to the specific form shown or uses mentioned except as defined in the accompanying claims.

I claim:

1. Flap mounting apparatus for trucks and the like comprising:
    elongated mud flap support means for attachment to frame members of a vehicle chassis and transversely thereof;
    means for attaching said support means to the frame members of the vehicle chassis;
    a plurality of mud flaps;
    means securing the upper end of each flap to the support means;
    reinforcing bar means extending transversely along the lower edge of the flaps for holding the lower ends of said flaps extended;
    rigid vertical bar means extending vertically along the center of the flap and having one end secured to the support means and the other end secured to the reinforcing bar means for preventing creeping of the mud flap;
    the upper end of each vertical bar is pivotly attached to the support means.

2. Flap mounting apparatus for trucks and the like, comprising:
    elongated mud flap support means for attachment to frame members of a vehicle chassis and transversely thereof;
    means for attaching said support means to the frame members of the vehicle chassis;
    a plurality of mud flaps;
    means securing the upper end of each flap to the support means;
    reinforcing bar means extending transversely along the lower edge of the flaps for holding the lower ends of said flaps extended;
    the means for attaching the support means to the frame members of a vehicle chassis comprising releasable means; and wherein the support means comprises a tubular central part and outer parts of substantially the same cross-section telescopically arranged with the central part and means for securing the parts in various telescope positions;
    a vertical bar for each flap for holding same extended, each bar having its upper and pivotly connected to a respective outer part of the support means; and means for releasably securing the lower end of each bar to the lower end of its respective flap and reinforcing bar.

3. The invention defined by claim 2, wherein when the central and outer parts of the support means are disassembled, and the rods are pivoted to a position parallel to the outer parts, the flaps are rolled about said parts and rods to form a compact package for carrying.

* * * * *